US008230718B2

(12) United States Patent
Swadling et al.

(10) Patent No.: US 8,230,718 B2
(45) Date of Patent: Jul. 31, 2012

(54) APPARATUS AND METHOD FOR DETECTING WEAR IN ROTOR PITCH LINK BEARINGS

(75) Inventors: Linda K. Swadling, Ft. Walton Beach, FL (US); Bryan Hinman, St. Augustine, FL (US); Dan Oliverius, Enterprise, AL (US)

(73) Assignee: Walin Tool, LLC, Ft. Walton Beach, FL (US)

( * ) Notice: Subject to any disclaimer, the term of this patent is extended or adjusted under 35 U.S.C. 154(b) by 317 days.

(21) Appl. No.: 12/339,269

(22) Filed: Dec. 19, 2008

(65) Prior Publication Data

US 2009/0205404 A1    Aug. 20, 2009

Related U.S. Application Data

(60) Provisional application No. 61/015,940, filed on Dec. 21, 2007.

(51) Int. Cl.
*G01N 3/56* (2006.01)
*G01N 19/02* (2006.01)
*G01N 19/00* (2006.01)
(52) U.S. Cl. .............................. 73/7; 73/865.8; 73/865.9
(58) Field of Classification Search .................... 73/593, 73/147, 1.79, 1.81, 1.84, 862.321, 862.27, 73/862.49; 74/89; 269/55, 57, 71, 73; 33/501
See application file for complete search history.

(56) References Cited

U.S. PATENT DOCUMENTS

| 3,786,695 | A | * | 1/1974 | Barrett, Jr. ....................... 74/586 |
| 4,053,123 | A | * | 10/1977 | Chadwick .................. 244/17.11 |
| 5,946,981 | A | * | 9/1999 | Ide et al. ..................... 74/579 R |
| 2007/0166162 | A1 | | 7/2007 | Podgurski |
| 2009/0300379 | A1 | * | 12/2009 | Mian et al. ..................... 713/300 |

OTHER PUBLICATIONS

Linda Swadling and Bryan Hinman, "Trammel Assembly for Rotor Pitch Links and Method of Using Same", Jul. 27, 2011, 23 pages, U.S. Appl. No. 13/191,974.

* cited by examiner

*Primary Examiner* — Lisa Caputo
*Assistant Examiner* — Roger Hernandez-Prewitt
(74) *Attorney, Agent, or Firm* — GrayRobinson, P.A.; Michael J. Colitz, III

(57) ABSTRACT

Disclosed is an apparatus that precisely measures the bearings in a rotor pitch link. The apparatus permits measurements to within a thousandths of an inch to be taken in multiple perpendicular orientations. Namely, measurements can be taken in the axial direction, in the longitudinal radial direction, and in the transverse radial direction. All of these measurements can be taken without having to reorient the pitch link. By using the apparatus of the present invention, a user can detect unacceptable levels of wear within the pitch link bearings to thereby permit timely replacement and/or repair.

10 Claims, 16 Drawing Sheets

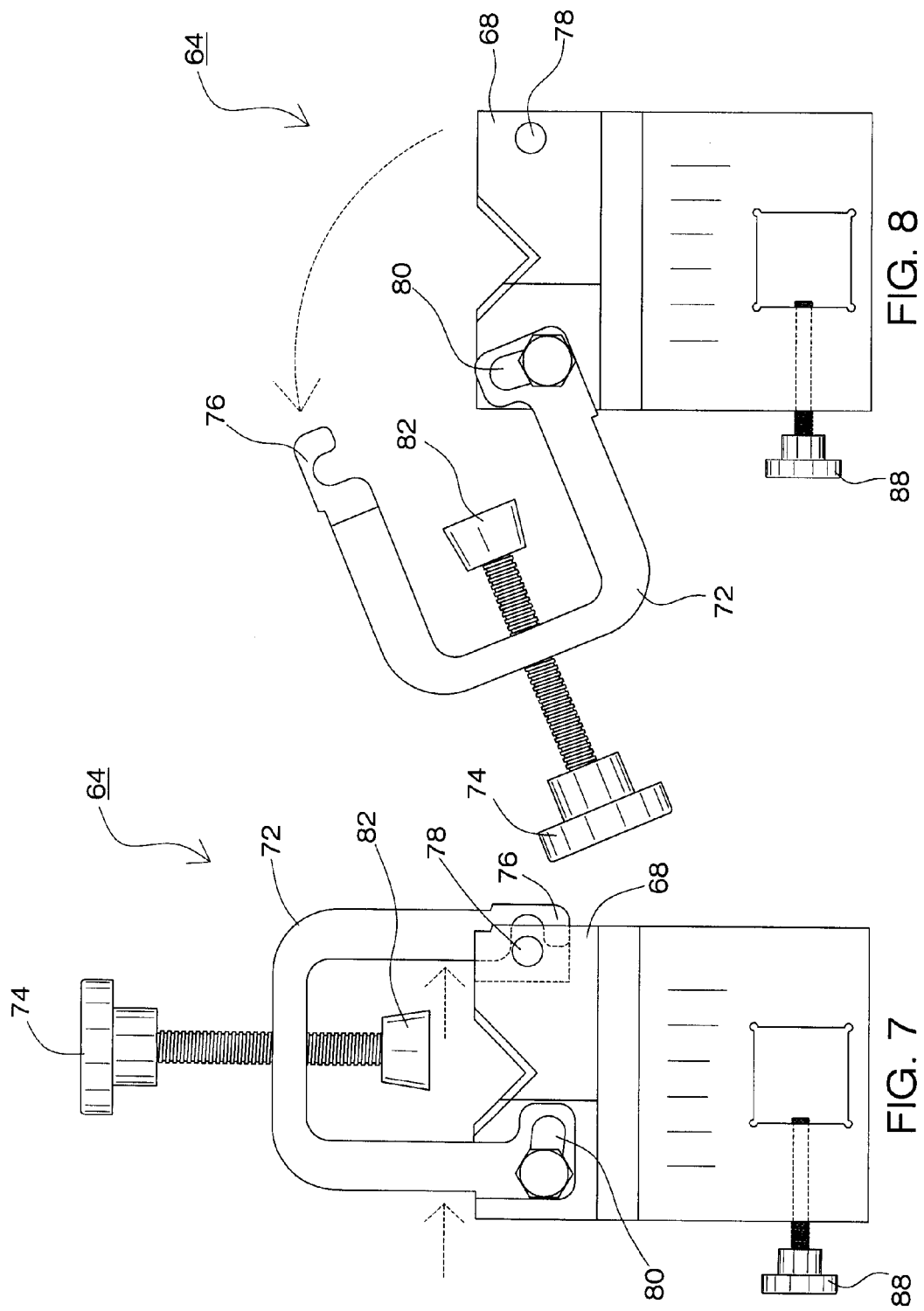

APPARATUS AND METHOD FOR DETECTING WEAR IN ROTOR PITCH LINK BEARINGS

RELATED APPLICATION DATA

This application claims priority to co-pending provisional application Ser. No. 61/015,940 filed Dec. 21, 2007 and entitled "Rotor Calibration Tool," the contents of which are fully incorporated herein.

BACKGROUND OF THE INVENTION

1. Field of the Invention

This invention relates to an apparatus for measuring bearing wear in multiple orientations. More particularly, the present invention relates to an apparatus that can measure the bearing wear in a rotor pitch link in axial, longitudinal, and transverse directions.

2. Description of the Background Art

As is known in the art, pitch links are adapted to be secured between the rotor blade and the rotor hub of a rotary wing aircraft. Pitch links rotate along with the rotor hub and permit the individual blades to be pitched so they can generate upward and forward thrusts. Pitch links are subjected to enormous cyclic stresses during the course of a typical flight. For this reason, pitch links must be constantly monitored for any signs of fatigue or damage. The failure to properly inspect pitch links for damage can have dire consequences, as even the smallest structural defect can lead to catastrophic results.

Various rotor pitch link designs have been advanced over the years that promote safety and/or adjustability. An example of one such design is described in U.S. Pat. No. 3,786,695 to Barrett. Barrett discloses a redundant pitch link, wherein a primary load path is provided for use during normal operation and a secondary load path is provided in the event the primary load path becomes inoperable. Accordingly, one load path remains operable in the event the first load path suffers a structural failure. The link of Barrett is also adjustable.

An adjustable pitch link is also described in U.S. Pat. No. 5,946,981 to Ide et al. Ide discloses a pitch link with first and second shaft members that are threadingly engaged with one another. The link further includes spherical bearings that are mounted in the rod ends. A guide member is also provided for guiding the first shaft member in an axial direction. Pitch link can also be adjusted automatically to reduce vibrations.

Thus, although the background art discloses pitch link constructions with improved structural integrity and adjustability, none of the background art is aimed at improved measuring techniques for detecting wear within a rotor pitch link and its associated bearings. The present invention is directed at fulfilling this need.

SUMMARY OF THE INVENTION

It is therefore one of the objectives of this invention to permit the detection of wear within the bearings of a rotor pitch link.

It is another objective of this invention to permit the wear to be detected in a rotor pitch bearing in three orthogonal orientations.

It is yet another objective of this invention to provide an apparatus that supports a rotor pitch link in an orientation that facilitates measurements in multiple orientations.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 7 is a front elevational view of one of the horseshoe clamps in the closed orientation.

FIG. 8 is a front elevational view of one of the horseshoe clamps in the opened orientation.

Similar reference characters refer to similar parts throughout the several views of the drawings.

DETAILED DESCRIPTION OF THE PREFERRED EMBODIMENT

The present invention is an apparatus that precisely measures the bearings in a rotor pitch link. More specifically, the apparatus permits precise measurements to be taken in multiple orthogonal orientations. Namely, measurements can be taken in the axial, longitudinal, and transverse directions. All of these measurements can be taken without having to reorient the pitch link within the apparatus. By using the apparatus of the present invention, a user can detect unacceptable levels of wear within the bearings to thereby permit timely replacement and/or repair.

Rotor Pitch Links

Figure 1:
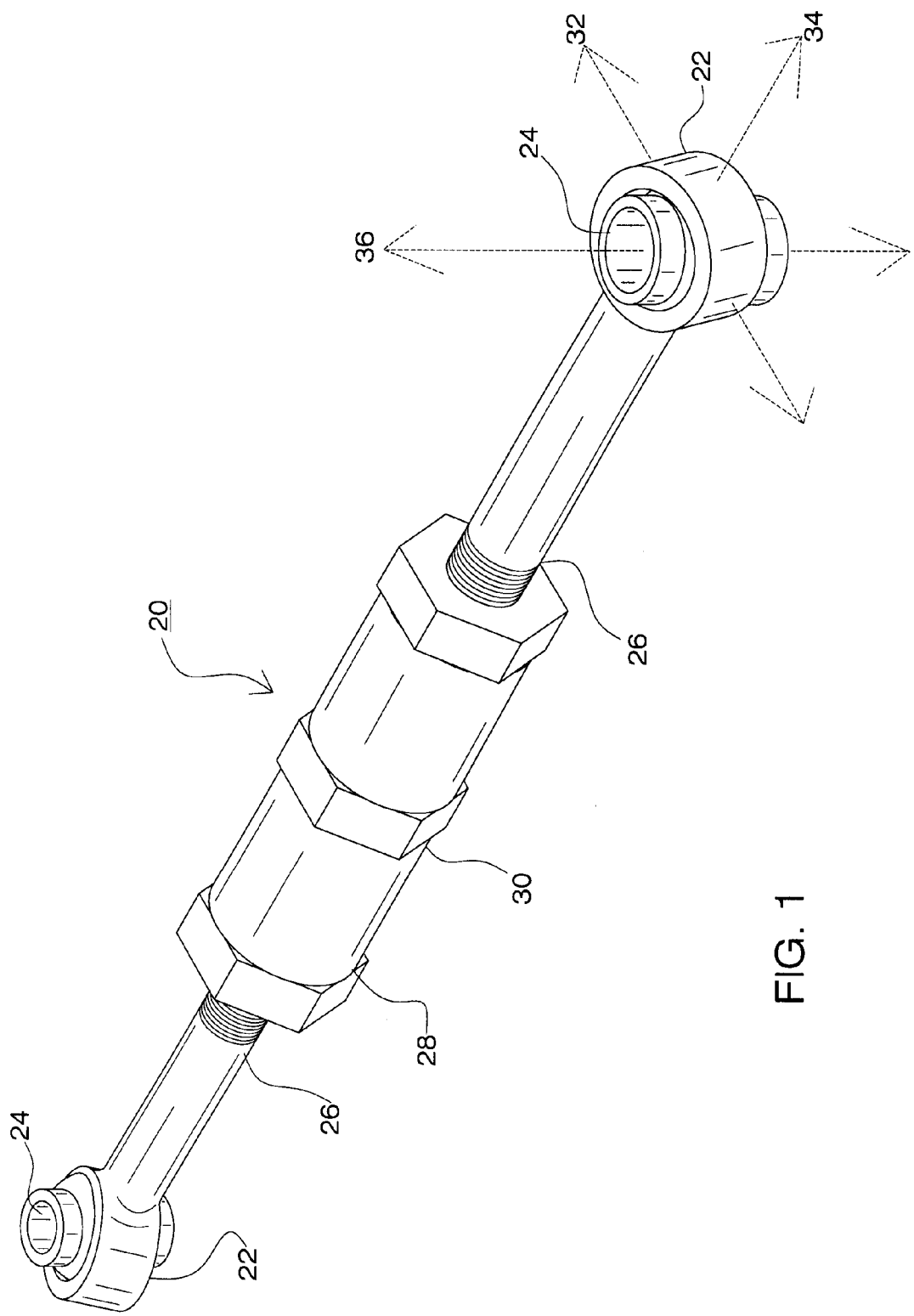
FIG. 1 is a perspective view of a rotor pitch link showing the axial, longitudinal and transverse axes.
Figure 2:
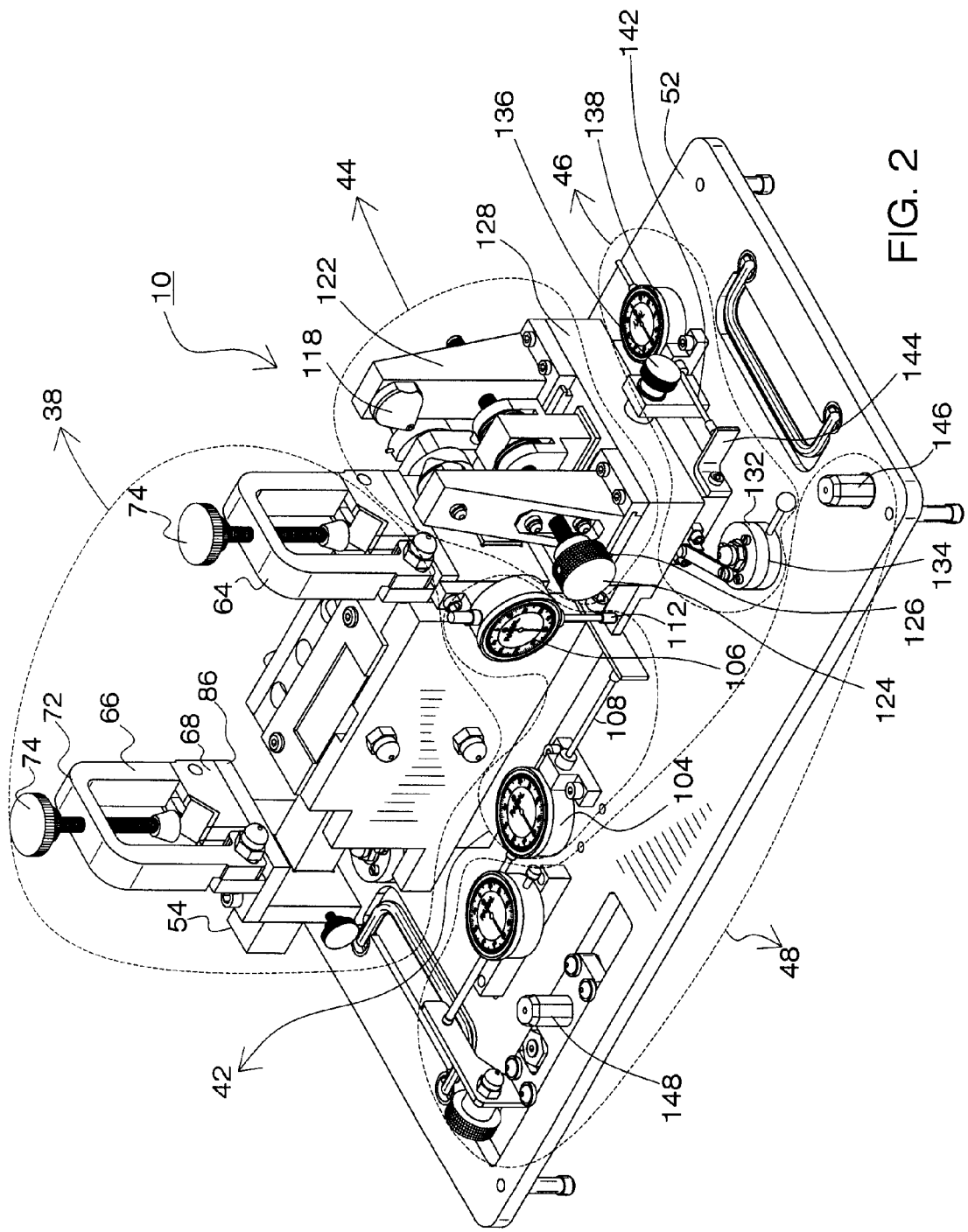
FIG. 2 is a front perspective view of the apparatus of the present invention taken from the forward end.
Figure 3:
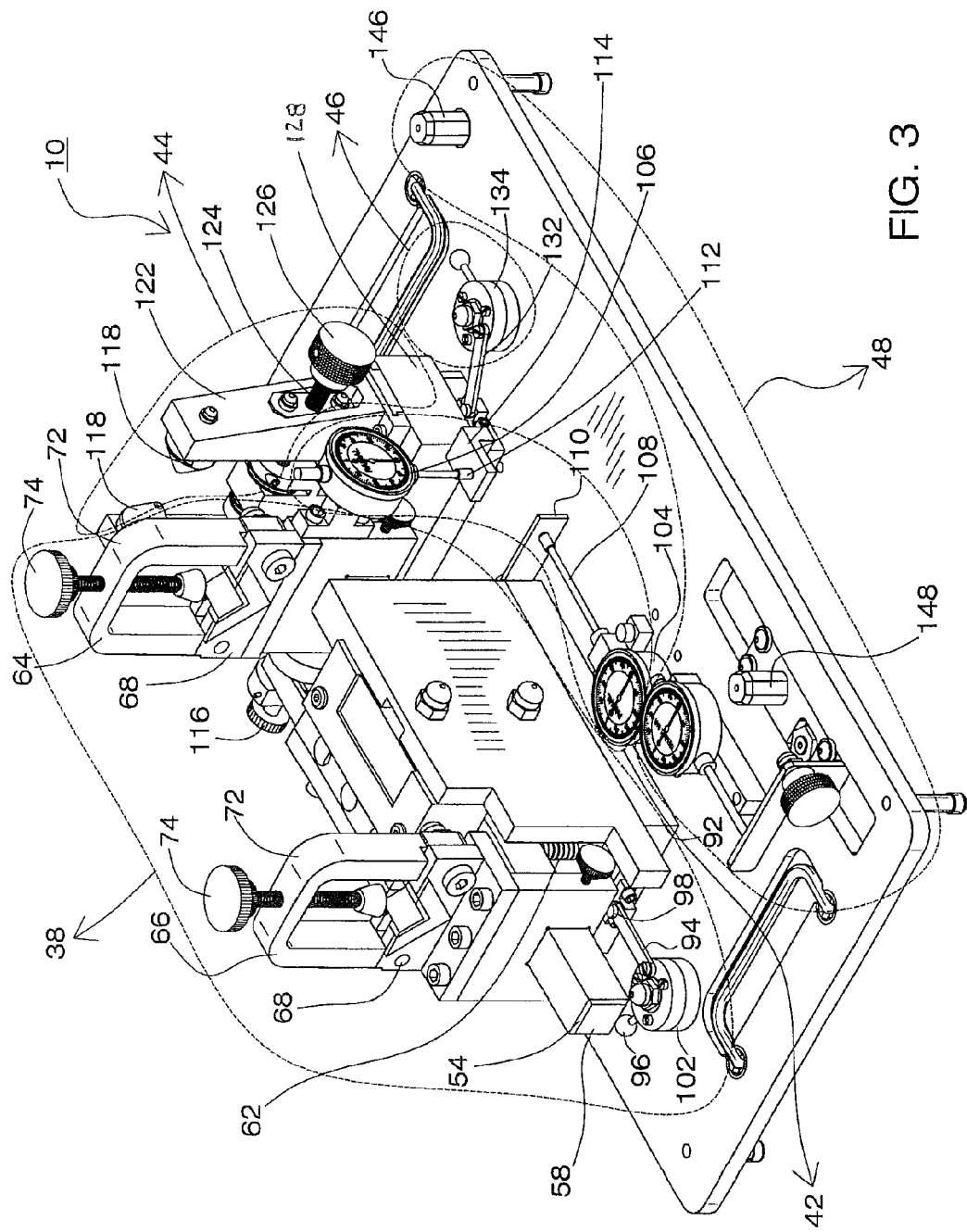
FIG. 3 is a front perspective view of the apparatus of the present invention taken from the rearward end.
Figure 4:
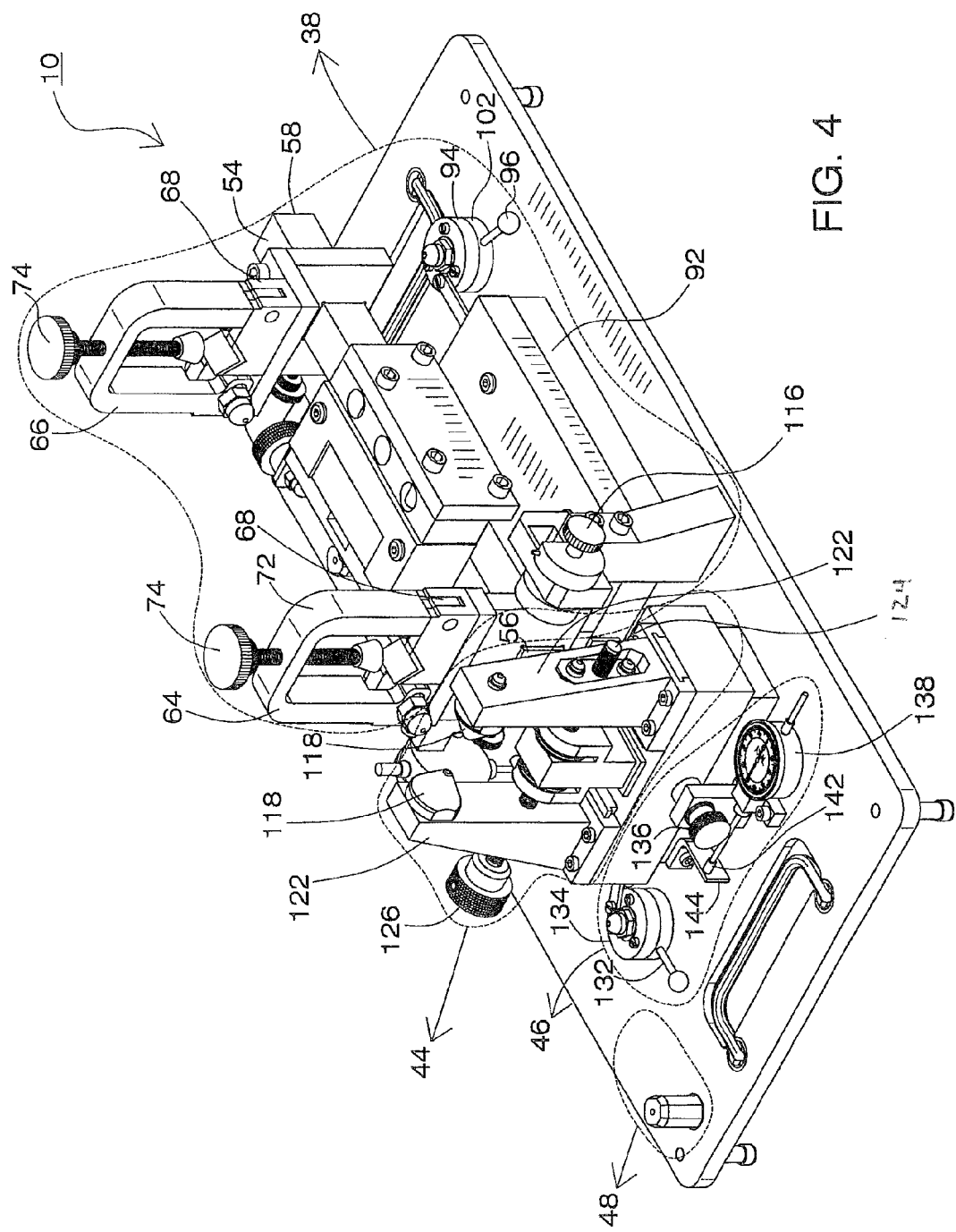
FIG. 4 is a rear perspective view of the apparatus taken from the forward end.
Figure 5:
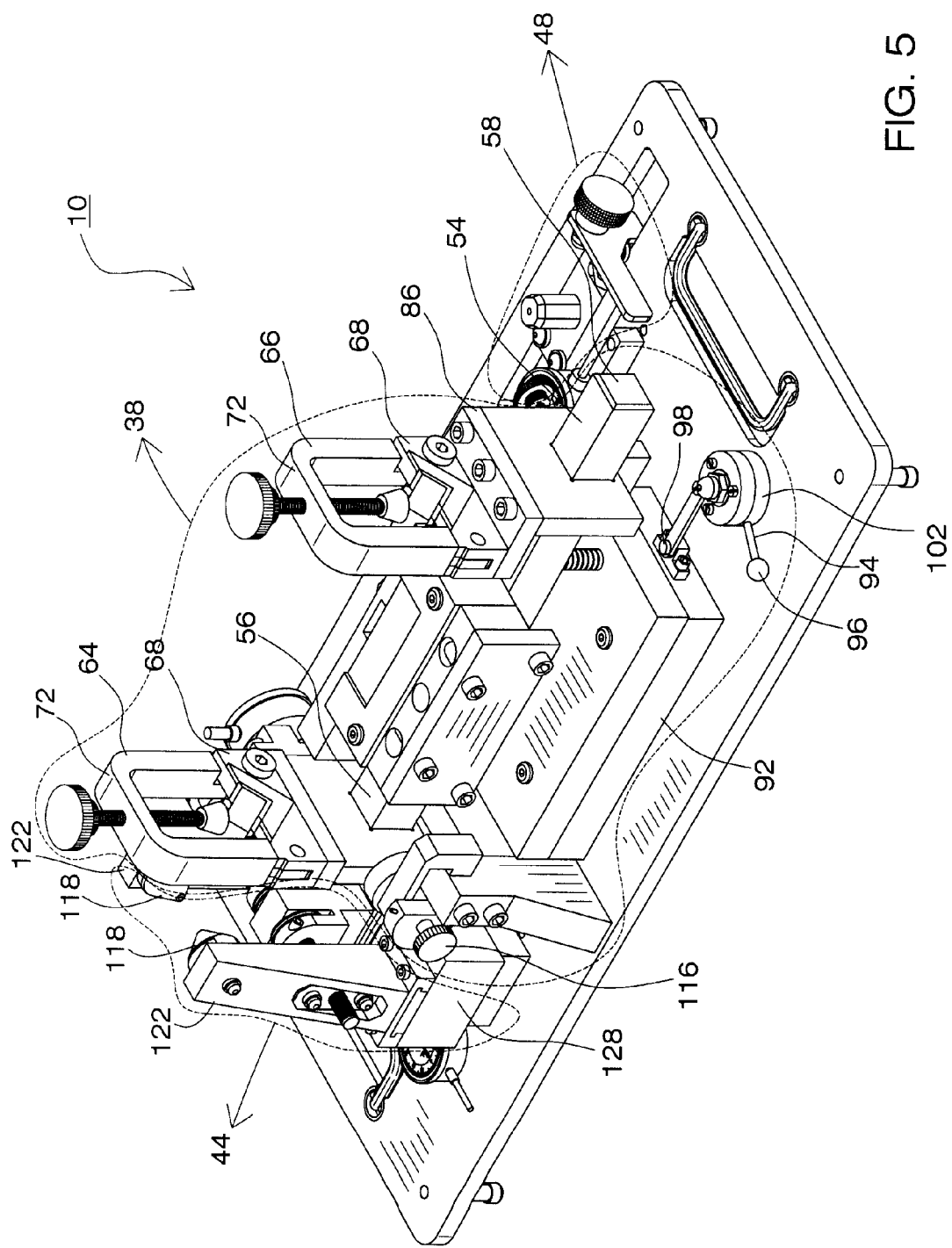
FIG. 5 is a rear perspective view of the apparatus taken from the rearward end.
Figure 6:
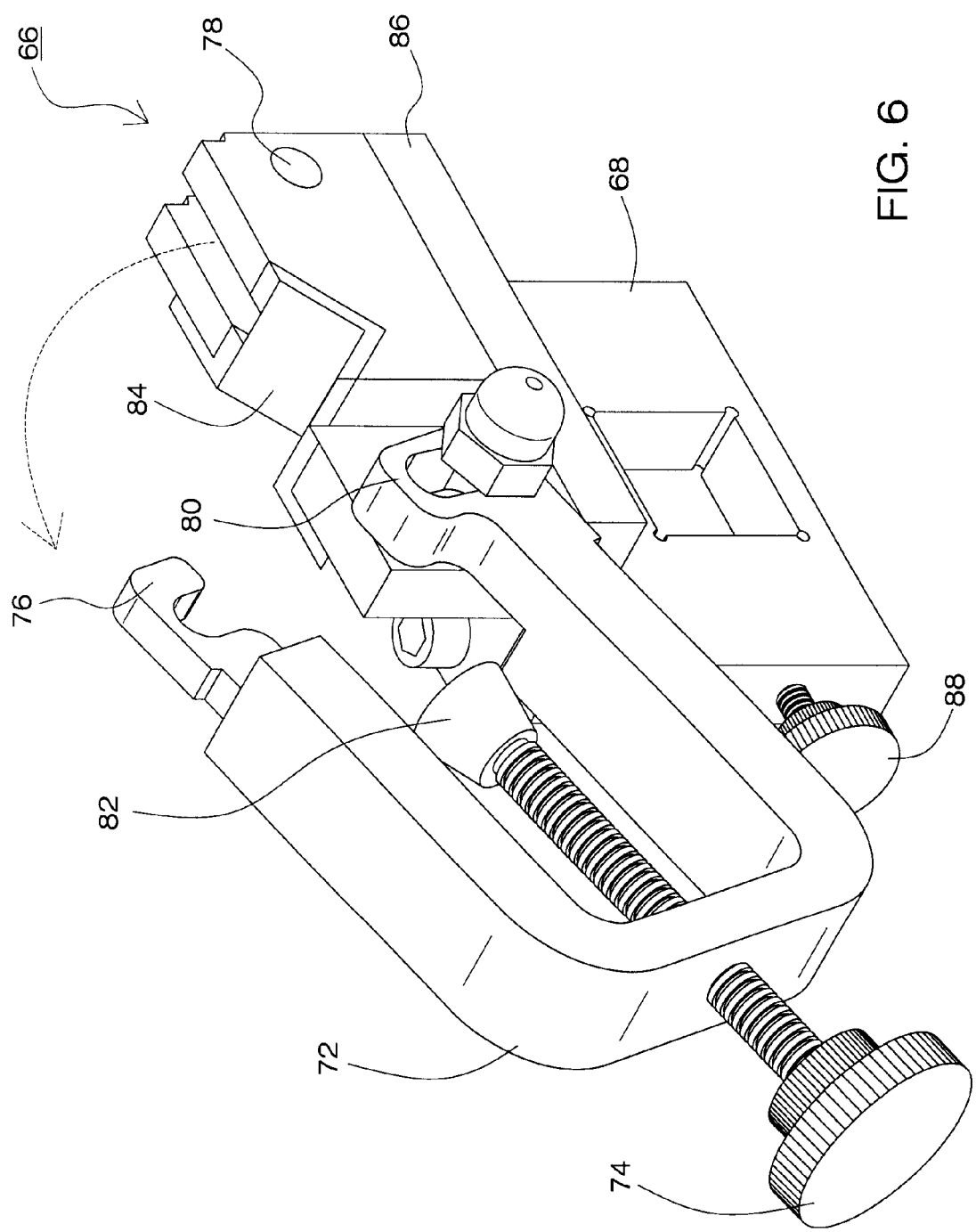
FIG. 6 is a detailed perspective view of one of the horseshoe clamps and sleds utilized by the link support subassembly.
Figure 11:
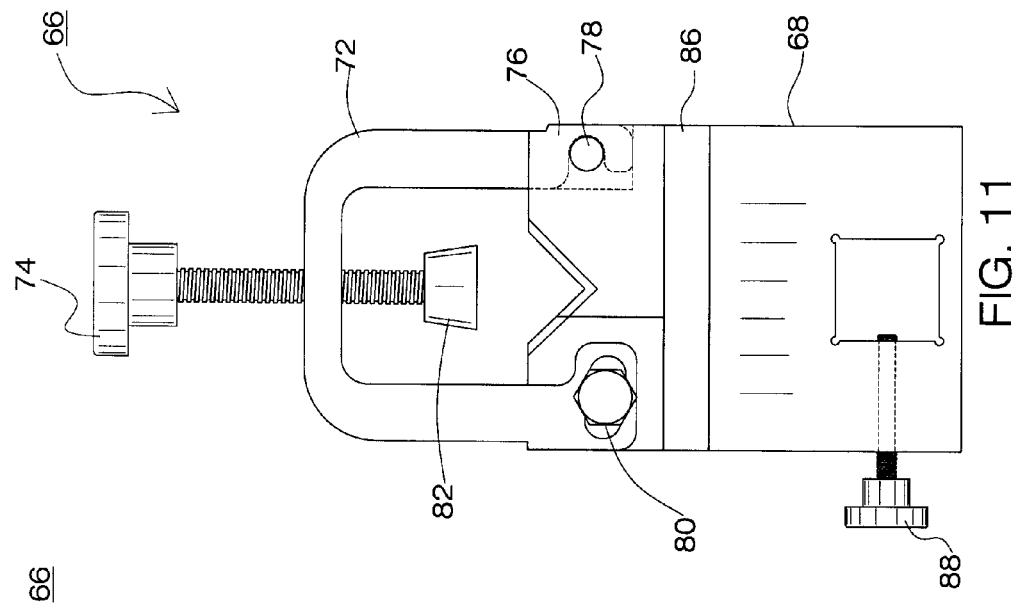
FIG. 11 is a front elevational view of a horseshoe clamp and associated offset sled.

The apparatus 10 of the present invention is especially suited for taking measurements upon rotor pitch links 20 of the type depicted in FIG. 1. This pitch link 20 includes bearing races 22 that are formed on its opposing ends. Each of the races 22 rotatably receives a corresponding bearing 24. As is known in the art, the arm can be formed from separate threaded segments 26 that are threadably received within a central housing 28. The segments 26 and housing 28 together form the arm 30 of the link 20. This arrangement allows for selective length adjustments by screwing segments 26 into or out of central housing 28. Pitch link 20 can also include a smaller bearing within a first end of the arm and a larger bearing within the second end of the arm. Rotor pitch links are also provided in a variety of sizes to accommodate varying aircraft designs. Smaller rotor pitch links can also be used for tail rotors, with larger links being used for main rotor assemblies. Whatever size is used, bearings 24 are employed to secure the pitch link between the rotor blade and the associated rotor hub of the aircraft. As those skilled in the art will appreciate, the bearings need to be sufficiently lubricated and free of wear to ensure the proper movement of the rotor assembly.

The apparatus 10 of the present invention is designed to detect wear within the rotor link bearings 24. The apparatus 10 is adjustable so that measurements can be made upon either longer main rotor pitch links or shorter tail rotor pitch links. In either case, apparatus 10 can simultaneously detect wear in three orthogonal orientations. As noted in FIG. 1, these orientations include one axial 36 and two radial directions (34 and 32). The second radial direction runs between the opposing sides of bearing 24. The first radial direction 34 runs longitudinally along the length of link 20. The axial direction 36 runs in a transverse direction, which is in a direction that is a transverse direction to the length of link 20. Thus, the axial 36 and the two radial axes (34 and 32) are all orthogonal to one another.

Apparatus 10 achieves precise measurements in the axial and radial directions by way of four interconnected subassemblies. These subassemblies include: a link support subassembly 38 for supporting the arm of the rotor link 20; a radial measurement subassembly 42 for detecting wear in the two radial directions; a bearing support subassembly 44 for supporting the rotor link bearing; and an axial measurement subassembly 46 for detecting wear in the axial direction. Additionally, a trammel subassembly 48 can also be included for measuring the overall length of link 20. Each of these subassemblies is mounted upon a portable deck 52, thereby making the entire apparatus 10 portable.

Link Support Subassembly

The link support assembly 38 is described in conjunction with FIGS. 2-5. The major component of this subassembly is a support rail 54. Support rail 54 has a generally rectangular cross section and is defined by a lower surface and forward and rearward ends (56 and 58). In a manner described in greater detail hereinafter, support rail 54 is supported at a distance above the deck via a series of support springs 62. The link support subassembly 38 further includes forward and rearward clamp assemblies (64 and 66) that are slidably positioned along the length of support rail 54. These clamp assemblies (64 and 66) can be selectively positioned at any point along the length of rail 54 to engage arm 30 of rotor link 20.

Detailed views of the clamp assemblies (64 and 66) are included in FIGS. 6-11. As illustrated, each of the clamp assemblies (64 and 66) includes a lower sled 68 and an upper horseshoe clamp 72. Each horseshoe clamp 72, in turn, includes a clamping screw 74. Each horseshoe clamp 72 pivots with respect to its sled 68 between opened and closed positions. One leg of each horseshoe clamp 72 preferably includes a hook 76 for coupling the leg to a pin 78 within sled 68 (note FIG. 6). The other leg of the horseshoe can include a pivot that rides within a slot 80 thereby permitting a small degree of lateral movement. This permits the clamp (64 or 66) to be locked into place by securing hook 76 to the associated pin 78 and thereafter sliding the clamp (64 or 66) laterally via slot 80. With the horseshoe 72 in the closed orientation, the clamping screw 74 can be threaded downward to engage the arm 30 of rotor link 20. The lower extent of screw 74 preferably includes a copper swivel 82. Alternatively, copper swivel could be replaced by a rubber stopper to eliminate damage to the rotor link 20. Each sled 68 further includes a v-shaped bed 84 to receive arm 30 of rotor link 20. Thus, when fully secured the arm 30 of the rotor link 20 rests between stopper 82 and the v-shaped bed 84.

Figure 10:
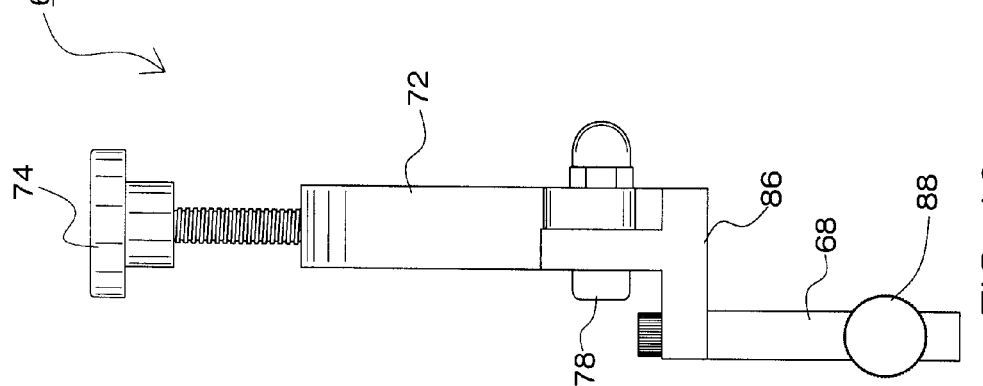
FIG. 10 is a side elevational view of a horseshoe clamp and associated offset sled.
Figure 9:
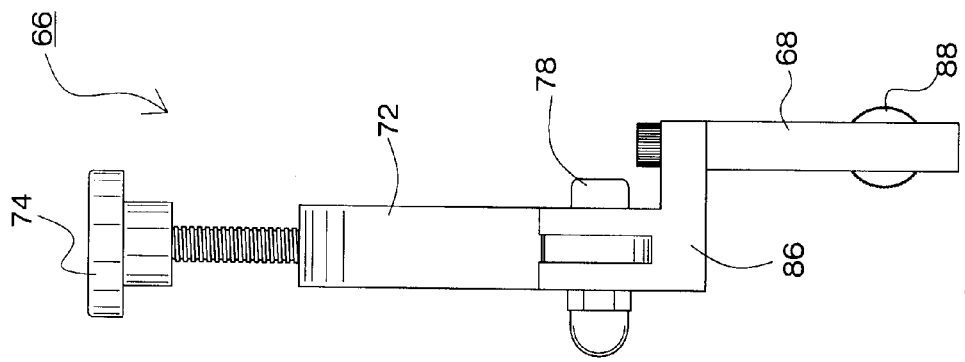
FIG. 9 is a side elevational view of a horseshoe clamp and associated offset sled.
Figure 14:
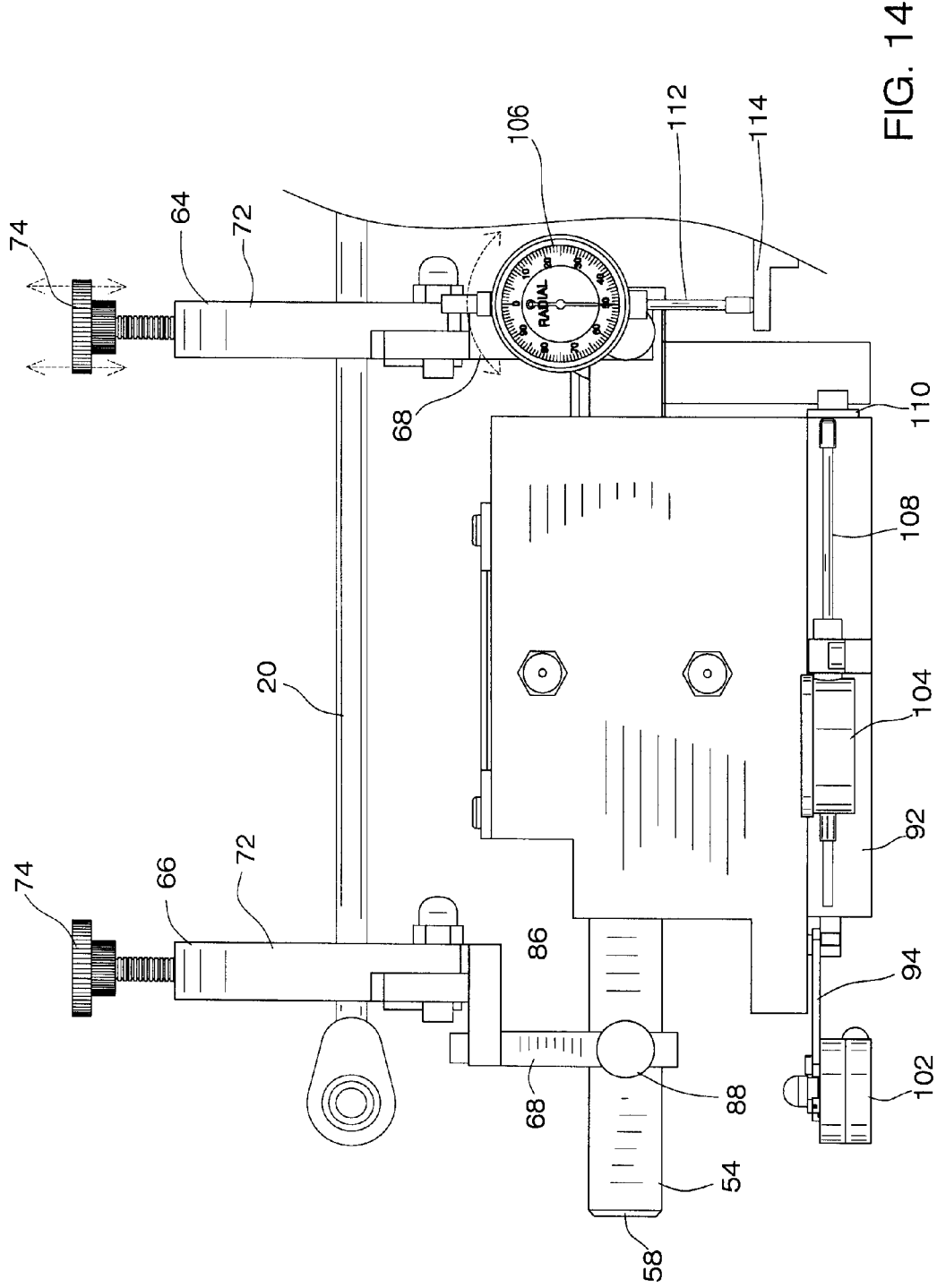
FIG. 14 is a side elevational view of the radial measurement subassembly with pressure being applied to the forward sled and with the offset sled in a first orientation.
Figure 15:
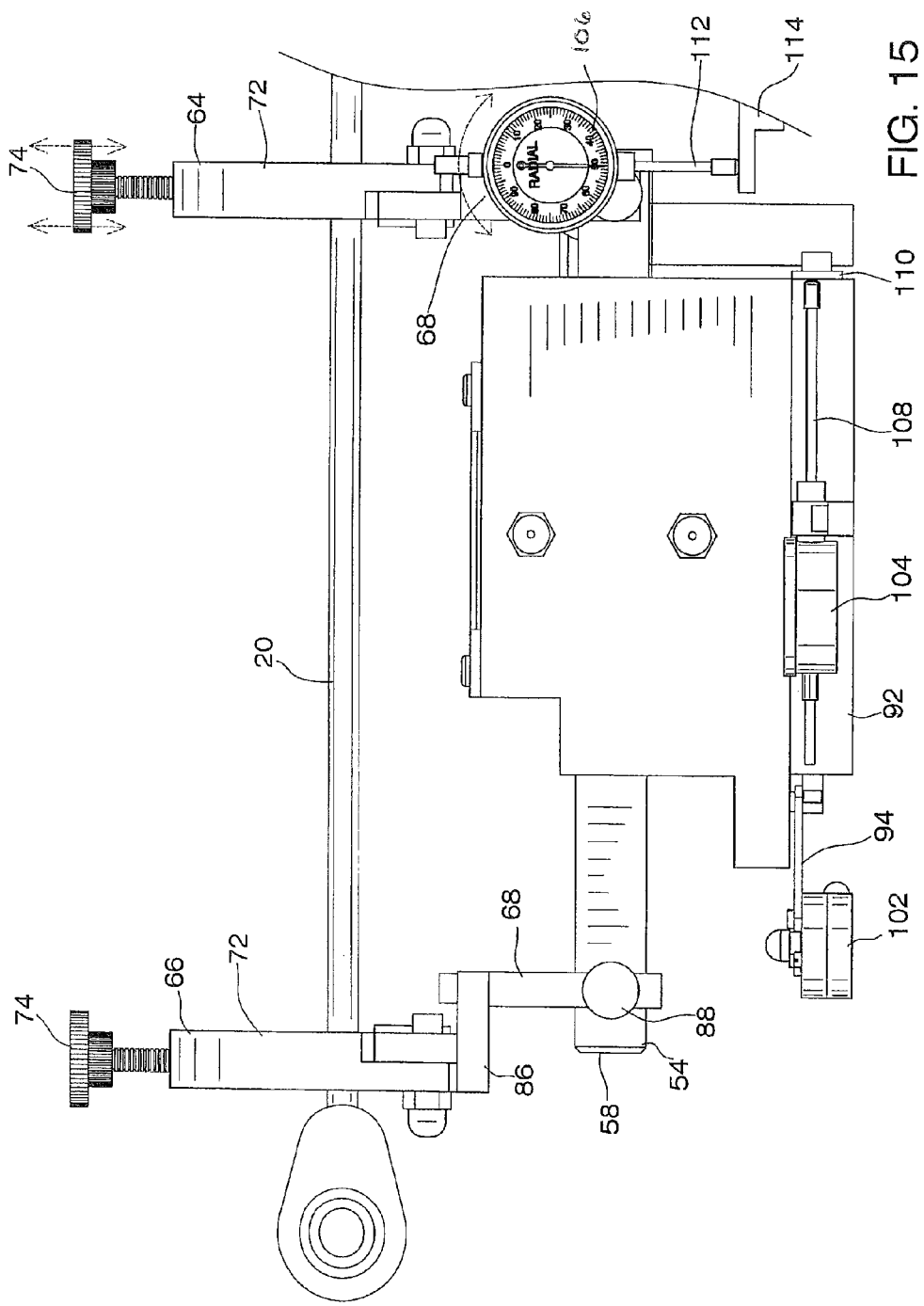
FIG. 15 is a side elevational view of the radial measurement subassembly with pressure being applied to the forward sled and with the offset sled in a second extended orientation.

FIGS. 9 and 10 illustrate the offset ledge 86 that is included on the sled 68 of the rearward clamp assembly 66. The offset 86 allows both longer and shorter rotor links 20 be accommodated by apparatus 10. Namely, sled 68 can be removed from rail 54 and reoriented such that the offset 86 either points to the forward or rearward end of the apparatus 10. Thus, when longer pitch links 20 are being inspected, such as main rotor links, offset 86 can extend beyond the reward end of support rail 64 (FIG. 15). Conversely, when shorter links are to be accommodated, offset 86 can be oriented inwardly (FIG. 14). In either orientation, both the forward and rearward clamps (64 or 66) can be selectively positioned and secured anywhere along the length of support rail 54. In this regard, each of the sleds includes locking bolts 88 for securing it a particular position along rail 54. In this manner, rotor pitch links 20 of various lengths can be accommodated.

Radial Measurement Subassembly

Figure 12:
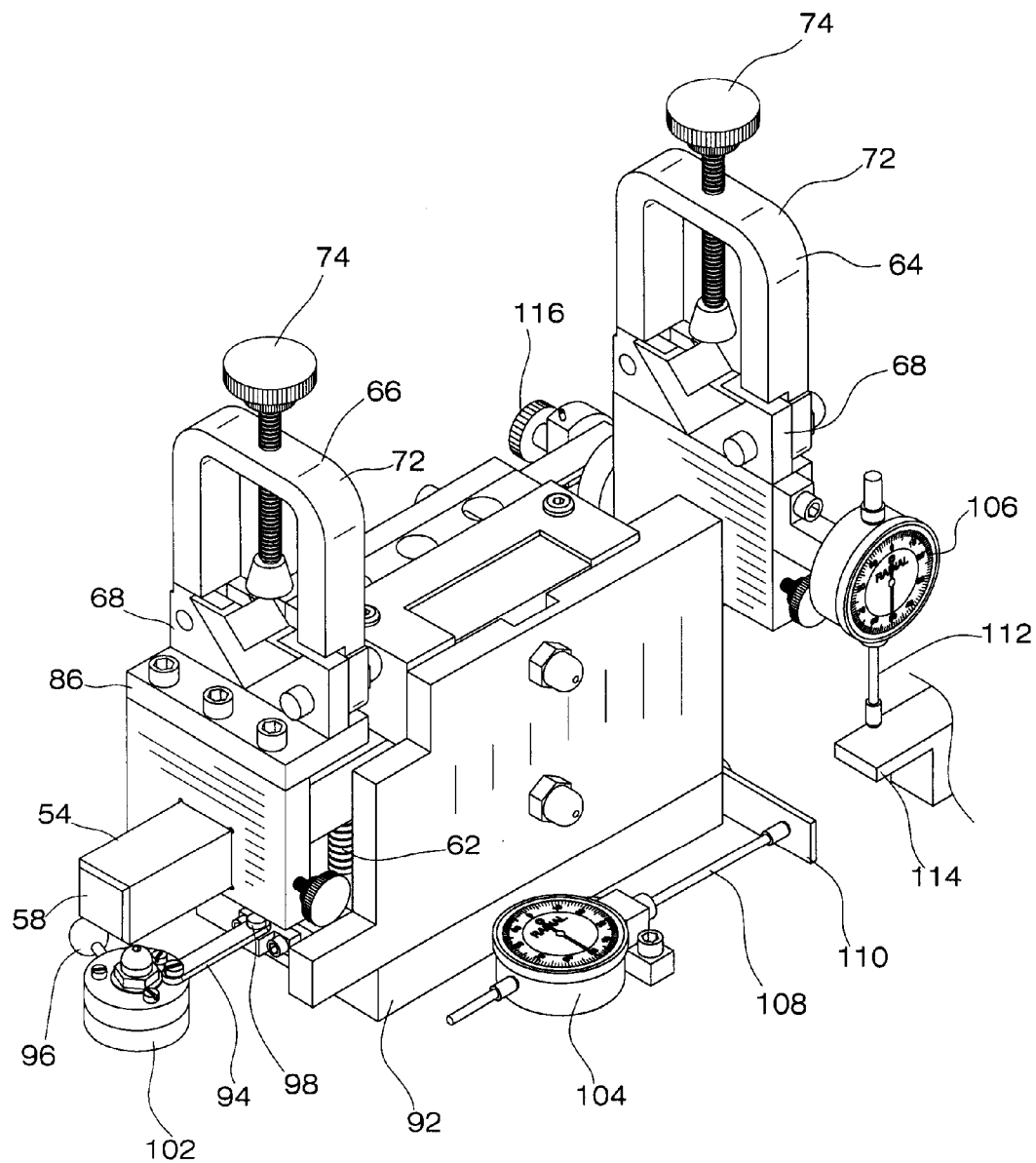
FIG. 12 is a front perspective view of the radial measurement subassembly of the present invention.
Figure 13:
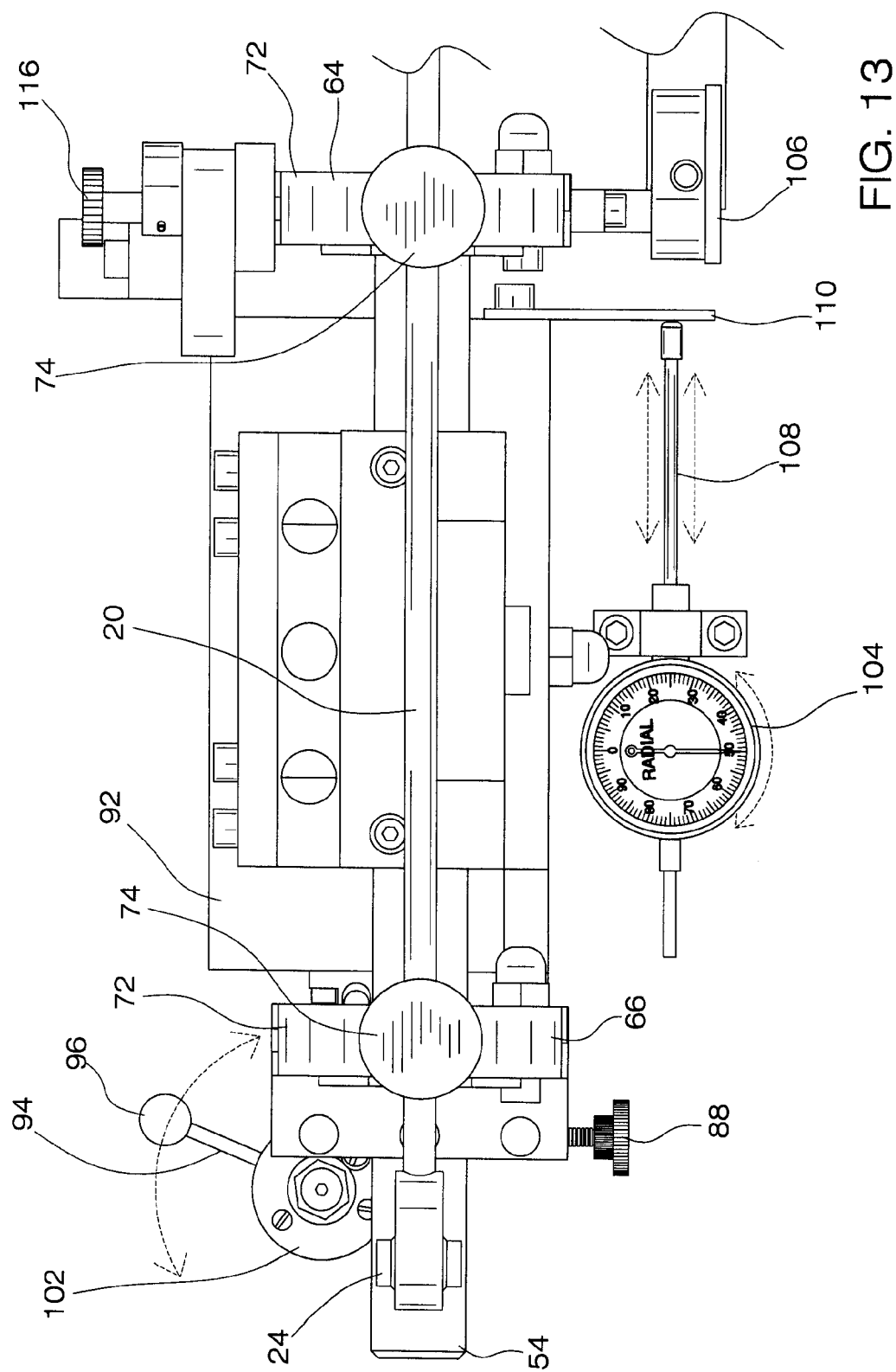
FIG. 13 is a top plan view of the radial measurement subassembly of the present invention.

Radial measurements are carried out via the lengthwise and transverse movement of support rail 54. This movement is achieved by way of a radial slide 92 and associated support springs 62 (note FIG. 12). Suitable radial slides 92 can be purchased commercially, such as the line of linear slides sold by Parker Hannifin Corporation. The fixed portion of slide 92 is secured to the deck, while the movable portion of slide 92 is interconnected to the lower surface of the support rail 54 via the coil springs 62. Thus, movement of the linear slide 92, in turn, results in the lengthwise movement of support rail 54. Support rail 54 is also afforded a limited degree of transverse movement via support springs 62.

Precise positioning and movement of slide 92 can be achieved via a radial linkage 94. Linkage 94 is preferably a two bar linkage. One end of the linkage forms a handle 96 for the user, while the other end 98 of the linkage is pivotally secured to the movable bed of radial slide 92 (note FIG. 12). Linkage 94 can thus be manipulated by the user to position support rail 54 anywhere along the first longitudinal direction. In use, bearing 24 is secured to the bearing support subassembly 44 (as noted hereinafter) and arm 30 is secured to the link support subassembly 38. A user can then use the linkage to apply radial forces to bearing 24. This allows for the precise measurement of any wear or play within bearing 24. A radial lock 116 is also included for preventing movement of slide 92.

However, in order to ensure an uniform application of force during such measurements, radial linkage 94 includes a breakaway coupling 102. Namely, a clutch-type coupling 102 is formed between the two links of linkage 94. Breakaway coupling 102 functions by only transmitting forces below a specified amount. Thus, if a user applies too much force to handle 96 of linkage 94, coupling 102 will give way and linkage 94 will not move support rail 54.

Radial measurement subassembly 42 also employs two different gauges. A first gauge 104 is used to measure the longitudinal, or lengthwise, movement of support rail 54. A second gauge 106 is used to measure the transverse, or up and down, movement of support rail 54. With a rotor link 20 properly secured to apparatus 10, the gauges (104 and 106) can be used to measure the corresponding play within bearing 24. The preferred gauges can be any commercially available micrometers capable of measuring linear movements to within a thousandth of an inch.

First radial gauge 104 is positioned such that it can measure movements of support rail 54 along the first radial direction 34. Namely, wear in the longitudinal direction 34 as indicated in FIG. 1. To accomplish this, first radial gauge 104, which is secured to the deck 52, includes a plunger 108 that rests upon a plate 110 that is, in turn, secured to the movable bed of radial slide 92. Thus, with plunger 108 touching plate 110, the user can use radial linkage 94 to move the support rail 54 rearwardly. The rearward movement will continue until the breakaway force is encountered. The maximum distance traversed without triggering the breakaway coupling represents the longitudinal play within bearing 24. Gauge 104 can likewise be configured to measure forward movements.

Second radial gauge 106 shares a similar construction as first gauge 104 but is oriented to detect linear movement in the second radial direction 32 that is perpendicular to the movement detected by first gauge 104. Second gauge 106 likewise includes a plunger 112 that extends to contact a support plate 114. Support plate 114, in turn, is interconnected to link support subassembly 38. Thus, second radial gauge 106 is mounted to measure the up and down movement of support rail 54. This measurement is taken when sufficient downward pressure is applied to overcome the force of support springs 62. Thus, with a rotor link properly secured to the apparatus 10, second gauge 106 measures transverse wear within bearing 24. Namely, wear in the second radial direction 32 as indicated in FIG. 1.

Bearing Support Subassembly

Figure 16:
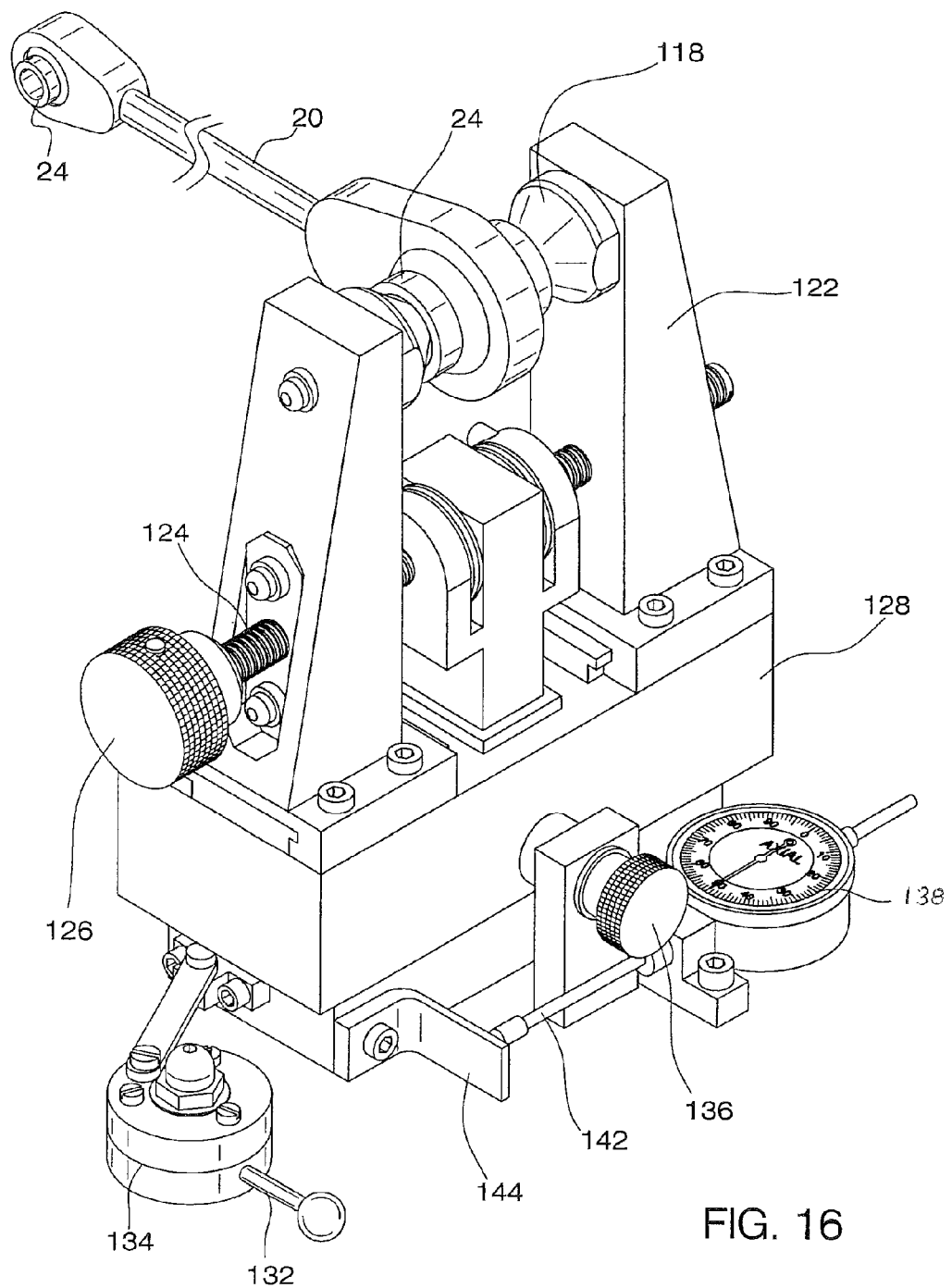
FIG. 16 is a perspective view of the axial measurement subassembly of the present invention.
Figure 17:
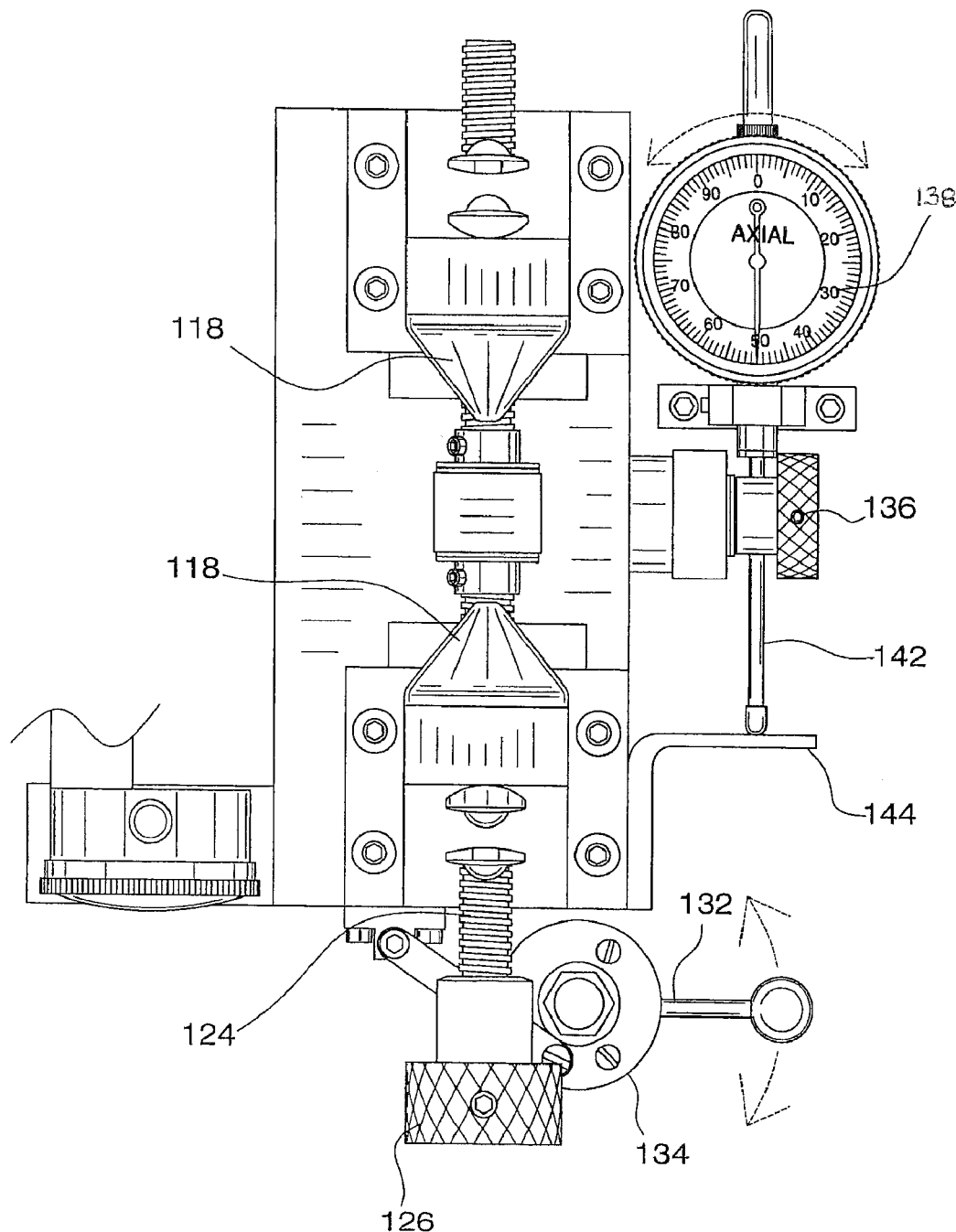
FIG. 17 is a top plan view of the axial measurement subassembly of the present invention.

FIGS. 16 and 17 are detailed views of the bearing support subassembly 44. As illustrated, this subassembly 44 functions in securing one of the link bearings 24. Bearing support 44 works in conjunction with link support 38 to retain the entire rotor link 20. Bearing support 44 subassembly includes opposing and axially aligned conical, or tapered, dowels 118. Dowels 118 are supported at a distance above deck 52 by opposing uprights 122. As noted more fully below, tapered dowels 118 are inserted into and thereby secure bearings 24 of rotor link 20. Tapered dowels 118 are therefore dimensioned to fit within either the small or large bearings 24 of a conventional rotor link 20.

Tapered dowels 118 can be moved inwardly and outwardly relative to one another by way of a threaded bolt 124. As best illustrated in FIG. 16, rotation of bolt 124 in a first sense causes the uprights 122 to move together, whereas rotation of bolt 124 in a second opposite sense causes tapered dowels 118 and uprights 122 to move apart. A user manipulates bolt 124 by way of a handle or knob 126. In the preferred embodiment, handle 126 is a slip handle that includes a rotatable clutch, whereby handle 126 is only responsive to forces below a predetermined threshold. Thus, handle 126 can be used to move the tapered dowels 118 inwardly and outwardly with respect to each other. This allows tapered dowels 118 to be snugly positioned within one of bearing ends 24 of the rotor link 20 However, over tightening by the user is prevented by way of the slip handle.

Axial Measurement Subassembly

Once a bearing 24 is properly secured by bearing support 44, a user can carry out axial wear measurements via the axial measurement subassembly 46. The primary component of this subassembly is an axial slide 128. As noted in conjunction with the radial measurement subassembly 42, axial slide 128 can be a commercially available slide, such as the type sold by Parker Hannifin Corporation. In this regard, axial slide 128 includes a fixed portion that is secured to deck 52 and a movable portion that supports the two uprights 122.

Axial slide 128 permits the entire bearing support subassembly 44 (including the uprights and dowels) to move back and forth in a direction that is perpendicular to the movement of support rail 54. Namely, slide permits movement in the axial direction 36 as noted in FIG. 1 which is read by gauge 138. Movement of slide 128 can be measured on gauge 138. Precise linear movement of slide 128 is achieved via an axial linkage 132. Axial linkage 132 includes a breakaway coupling 134, such that movement of the axial slide 128 is only achieved when forces below a predetermined amount are applied. This axial linkage 132 shares an identical construction and function with the radial linkage 94. Likewise, an axial lock 136 is included for preventing the linear movement of slide 128. As with radial gauges 104 and 106, axial gauge 138 includes an associated plunger 142 that contacts a plate 144. Plate 144 is, in turn, connected to the movable component of axial slide 128. Thus, movement of slide 128 in the direction 36 can be measured on gauge 138.

Method of Operation

In use, a rotor pitch link 20 is secured to the apparatus 10 by way of the link and bearing support subassemblies (38 and 44). This is accomplished by first securing one of the bearings 24 and thereafter securing the arm 30 of link 20. Namely, one of the bearing ends is secured within the bearing support 44 by placing bearing 24 between the opposing tapered dowels 118. Tapered dowels 118 can then be moved inwardly by rotating bolt 124. Once tapered dowels 118 are sufficiently snug, the slip handle 126 prevents further inward movement of tapered dowels 118. The step of securing bearing 24 is preferably carried out with rotor link 20 at a 45 degree angle relative to deck 52.

The link arm 30 can thereafter be secured via the link support subassembly 38. In first step in this process is to open the forward and rearward clamp 64 and 66. With the clamps opened, link 20 can be pivoted downwardly until the arm 30 rests within the v-shaped beds 84. Clamps 64 and 66 can then be closed. The arm 30 of link 20 can then be positively secured by tightening down on screws 74 until the rubber stoppers 82 exert a light pressure on arm 30. Rotor link 20 is now fully secured.

Radial wear can thereafter be detected by manipulating the radial linkage 94 to cause the linear movement of radial slide 92. This movement is accomplished without exceeding the threshold force of the breakaway coupling 102. The corresponding linear movement is detected by the first radial gauge 104. The distance corresponds to the wear of bearing 24 in the first radial direction 34. This value can be compared to acceptable wear levels to determine whether bearing 24 needs to be replaced. Transverse radial measurements are also made applying a slight downward force upon link 20. This causes link 20 to move downwardly against force of support spring 62. This movement is measured by second radial gauge 106. The measurement corresponds to the wear in the second radial direction 32. Tapered dowels 118 can thereafter be backed out of bearing 24 to permit bearing 24 to be rotated. This allows wear measurements to be carried out at different peripheral locations about bearing 24.

Finally, axial bearing wear is detected by manipulating axial linkage 132. This causes tapered dowels 118 to apply axial forces to bearings 24 within preset limits. The axial movement of bearing 24 is detected by the axial gauge 138. Again, if the movement detected by gauge 138 is too large, the user will know that the bearing needs to be replaced or repaired.

Trammel Subassembly

Figure 18:
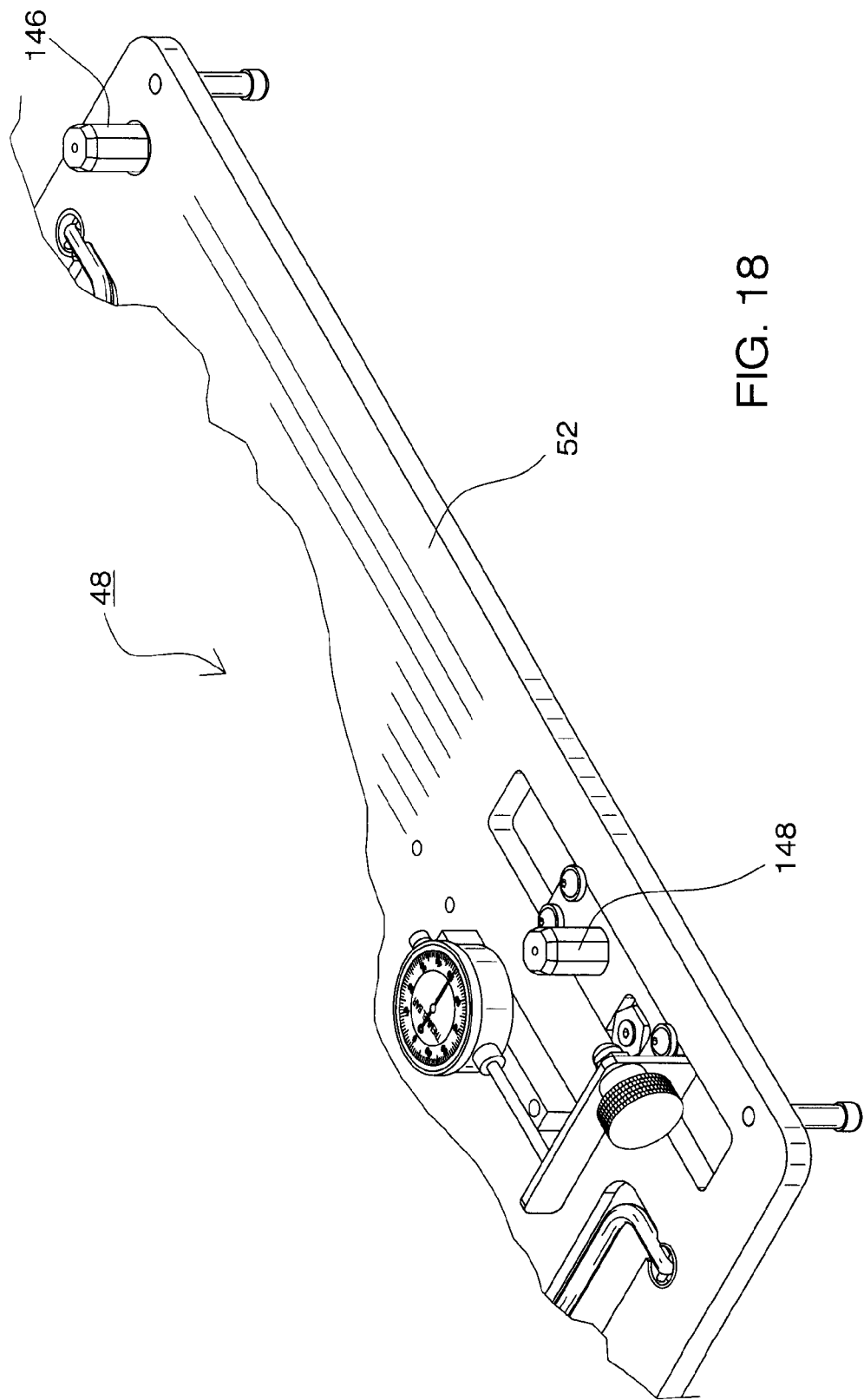
FIG. 18 is a perspective view of the trammel subassembly of the present invention.
Figure 19:
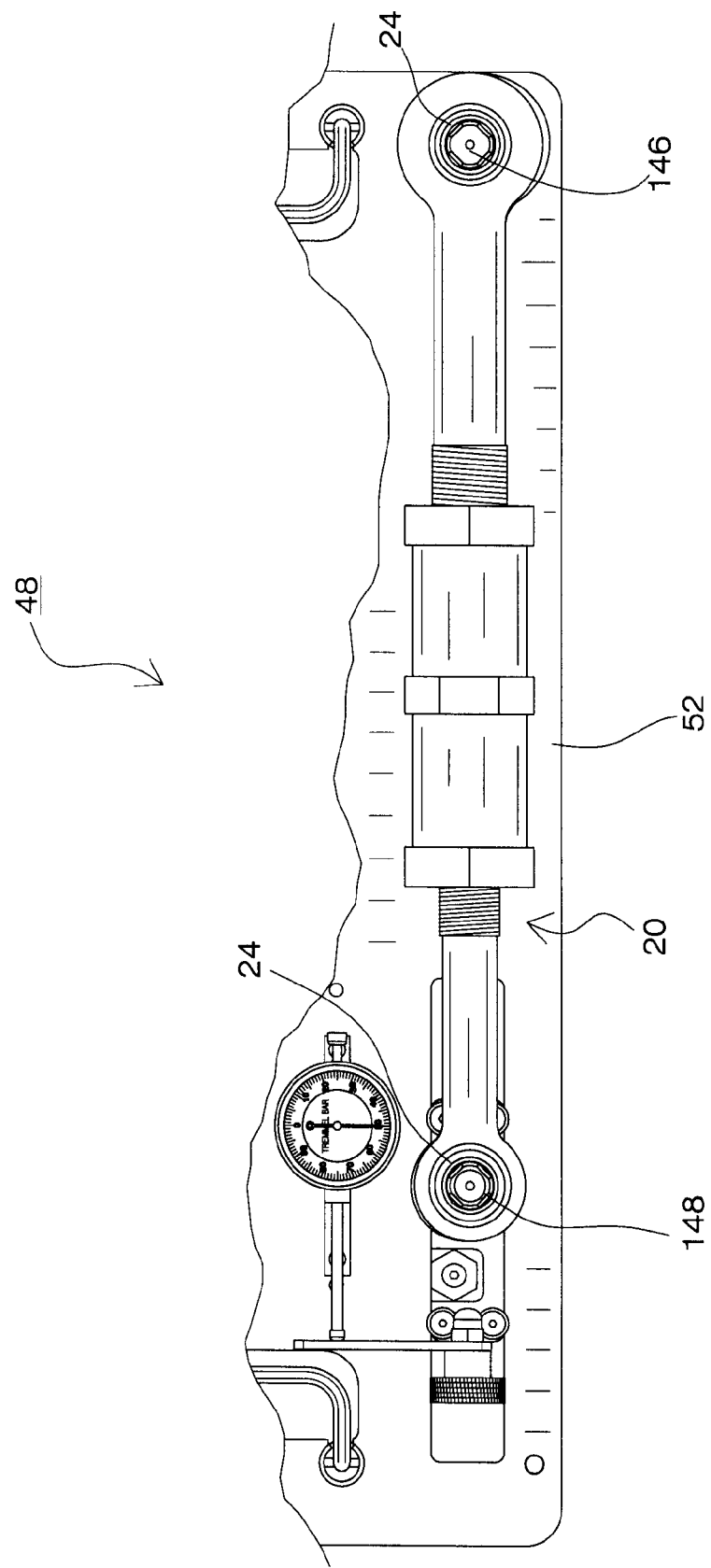
FIG. 19 is a top plan view of the trammel subassembly of the present invention.

In addition to the foregoing, the device can also be used to make lengthwise measurements of the rotor link via a trammel subassembly 48. As noted in FIGS. 18 and 19, the trammel subassembly 48 is mounted upon deck 52 and includes a first stationary bearing mount 146 and an opposing slidable bearing mount 148. Slidable bearing mount 148 is selectively movable along a first direction. This direction can be parallel to the orientation of support rail 54. In use, one of the bearings 24 is secured to the stationary bearing mount 146, while the opposite bearing 24 is secured to slidable bearing mount 148. In order to achieve a proper fit, the user will have to first change the position of slidable bearing mount 148. This is achieved by positioning mount 148 in a slotted opening. A retaining screw can be used to lock bearing 148 in place. A readout gauge is likewise provided to indicate the relative position of bearing 148. In this manner, accurate bearing to bearing measurements can be accomplished. In use, an operator can use trammel 48 to detect the bearing to bearing distance before carrying out axial or radial wear measurements or any other servicing of rotor link 20. Thereafter, before the link is returned to the aircraft, the trammel can be used to ensure that the overall bearing to bearing distance has been maintained.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An apparatus for detecting radial and axial wear in a rotor pitch link, the rotor pitch link having opposite bearing ends and an intermediate arm therebetween, the apparatus being supported upon a deck and comprising:

a link support subassembly comprising a support rail having a lower surface and forward and rearward ends, a rearward sled with an offset slidably and removably positioned upon the rearward end of the support rail, a horseshoe clamp with a locking screw secured to the offset, whereby longer rotor pitch links can be accommodated by orienting the rearward sled with the offset extending beyond the reward end of the support rail, a forward sled slidably positioned upon the forward end of the support rail, a horseshoe clamp with a locking screw secured to the forward sled, whereby the rearward and forward sleds can be selectively positioned along the support rail to support rotor pitch links of various lengths;

a radial measurement subassembly comprising a radial slide secured to the lower surface of the support rail and adapted to move the support rail along a first direction, a radial linkage interconnected to the radial slide and functioning to selectively move the support rail along the first direction, the radial linkage including a breakaway coupling, whereby the radial linkage is only responsive to forces below a predetermined amount, a radial lock for preventing the movement of the support rail, a first radial gauge for measuring the movement of the support rail along the first direction, a second radial gauge for measuring movement of the support rail in a second direction perpendicular to the first direction;

a bearing support subassembly comprising opposing and axially aligned conical dowels that are secured to opposing uprights, a threaded bolt interconnecting the uprights, wherein rotation of the bolt in a first sense causes the dowels and uprights to move together and wherein rotation of the bolt in a second opposite sense causes the dowels and uprights to move apart, a slip handle for rotating the bolt, whereby the slip handle is only responsive to forces below a predetermined amount;

an axial measurement subassembly comprising an axial slide, the axial slide supporting the uprights and dowels and adapted to move the uprights and dowels along a third direction that is perpendicular to the first and second directions, an axial linkage interconnected to the axial slide and functioning to selectively move the uprights and dowels along the third direction, the axial linkage including a breakaway coupling, whereby the axial linkage is only responsive to forces below a predetermined amount, an axial lock for preventing the movement of axial slide;

a trammel subassembly mounted upon the deck and including a first stationary bearing mount and an opposite slidable bearing mount, the slidable bearing mount being selectively movable along the first direction, a trammel gauge for measuring the movement of the movable bearing mount and wherein the opposite bearing ends of the rotor pitch link can be secured to the bearing mounts and wherein the distance between the bearings can be measured by way of the trammel gauge;

wherein a rotor pitch link can be secured to the apparatus by securing the arm of the pitch link to the forward and rearward horseshoe clamps and by further securing one of the bearing ends between the dowels, and wherein radial wear can be detected by manipulating the radial linkage and reading the first radial gauge and further by pushing up and down on the forward horseshoe clamp and reading the second radial gauge, and wherein axial wear can be detected by manipulating the axial linkage and by reading the axial gauge.

2. An apparatus for detecting radial and axial wear in a rotor pitch link comprising:

a link support subassembly comprising a support rail having a lower surface and forward and rearward ends, a rearward sled slidably and removably positioned upon the rearward end of the support rail, a clamp secured to the rearward sled, a forward sled slidably positioned upon the forward end of the support rail, a clamp secured to the forward sled, whereby the rearward and forward sleds can be selectively positioned along the support rail to support rotor pitch links of various lengths;

a radial measurement subassembly comprising a radial slide secured to the lower surface of the support rail and adapted to move the support rail along a first direction, a radial linkage interconnected to the radial slide and functioning to selectively move the support rail along the first direction, a first radial gauge for measuring the movement of the support rail along the first direction, whereby the radial linkage and the first radial gauge can be used to measure wear in the first direction.

3. The apparatus as described in claim 2 further comprising:
a bearing support subassembly comprising opposing and axially aligned conical dowels, a threaded bolt interconnecting the dowels, wherein rotation of the bolt in a first sense causes the dowels to move together and wherein rotation of the bolt in a second opposite sense causes the dowels and uprights to move apart;
an axial measurement subassembly comprising an axial slide and an associated axial gauge, the axial slide supporting the dowels and adapted to move the dowels along a direction that is perpendicular to the first direction, an axial linkage interconnected to the axial slide and functioning to selectively move the dowels, whereby the axial linkage and axial gauge can be used to measure wear in a direction that is perpendicular to the first direction.

4. The apparatus as described in claim 2 wherein a breakaway coupling is included in the radial linkage such that the linkage is only responsive to forces below a predetermined amount.

5. The apparatus as described in claim 3 wherein a breakaway coupling is included in the axial linkage such that the axial linkage is only responsive to forces below a predetermined amount.

6. The apparatus as described in claim 2 further comprising a trammel subassembly having a first stationary bearing and an opposite slidable mount, wherein opposite bearing ends of the rotor pitch link can be secured to the bearing mounts to determine the overall length of the link.

7. The apparatus as described in claim 2 wherein two radial gauges are provided for measuring wear in two different perpendicular directions.

8. The apparatus as described in claim 2 wherein the threaded bolt of the bearing support includes a slip handle such that the application of force above a predetermined amount will not move the dowels.

9. The apparatus as described in claim 2 wherein at least one of the sleds includes an offset and wherein the orientation of the offset can be changed to accommodate various sized links.

10. An apparatus for measuring wear comprising:
a rotor pitch link functioning to selectively change the pitch of one or more blades on a rotary winged craft, the rotor pitch link including an arm and at least one bearing;
a link support assembly adapted to be removably secured to the arm and bearing of the rotor pitch link;
a measurement assembly for selectively applying forces to the bearing in a plurality of orthogonal directions, whereby the corresponding wear can be measured.

* * * * *